(12) United States Patent
Oh et al.

(10) Patent No.: US 8,650,573 B2
(45) Date of Patent: Feb. 11, 2014

(54) SYSTEM AND METHOD FOR CONTROLLING PRIORITY IN SCA MULTI-COMPONENT AND MULTI-PORT ENVIRONMENT

(75) Inventors: Sang Chul Oh, Daejeon (KR); Nam Hoon Park, Daejon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 824 days.

(21) Appl. No.: 12/480,051

(22) Filed: Jun. 8, 2009

(65) Prior Publication Data

US 2009/0241120 A1    Sep. 24, 2009

Related U.S. Application Data

(63) Continuation of application No. PCT/KR2007/004964, filed on Oct. 11, 2007.

(30) Foreign Application Priority Data

Dec. 8, 2006 (KR) .................. 10-2006-0125045

(51) Int. Cl.
*G06F 9/46* (2006.01)
*G06F 13/36* (2006.01)

(52) U.S. Cl.
USPC .......................... 718/103; 710/116

(58) Field of Classification Search
None
See application file for complete search history.

(56) References Cited

U.S. PATENT DOCUMENTS

| 4,166,289 A * | 8/1979 | Murtha et al. ............ 710/33 |
| 4,943,932 A * | 7/1990 | Lark et al. ............... 706/60 |
| 5,574,505 A | 11/1996 | Lyons et al. |
| 6,574,688 B1 | 6/2003 | Dale et al. |
| 6,882,642 B1 * | 4/2005 | Kejriwal et al. ............ 370/388 |
| 2003/0216927 A1 * | 11/2003 | Sridhar et al. ............... 705/1 |
| 2005/0027789 A1 | 2/2005 | Luo et al. |
| 2006/0041690 A1 * | 2/2006 | Lee et al. ................... 710/5 |
| 2006/0059483 A1 * | 3/2006 | De Bunje et al. ........... 718/100 |
| 2007/0016668 A1 * | 1/2007 | Rodriguez ................... 709/224 |

FOREIGN PATENT DOCUMENTS

| KR | 1020050051234 | 6/2005 |
| KR | 1020050055986 | 6/2005 |
| KR | 1020050066281 | 6/2005 |
| KR | 1020060065817 | 6/2006 |
| KR | 1020070061084 | 6/2007 |

OTHER PUBLICATIONS

Kim, Saehwa et al., "SCA-based Component Software Framework for SDR," *KIISE SIGCS Fall Workshop*, pp. 99-105 (2002).

* cited by examiner

*Primary Examiner* — Meng An
*Assistant Examiner* — Wissam Rashid
(74) *Attorney, Agent, or Firm* — Nelson Mullins Riley & Scarborough LLP; Anthony A. Laurentano; Lewis Lee

(57) ABSTRACT

A system for controlling priority in a SCA-based application having a plurality of components wherein each of the components has a plurality of ports, includes: a priority component scheduler, interworking with the plurality of components wherein component priority order of the components is arranged therein; and a priority port scheduler that is provided in each of the components including the plurality of the ports which are associated with connections between the components, wherein port priority order of the ports included in each of the components is arranged therein. The priority component scheduler may be generated by using domain profiles in which component priority values of the components are set and the priority port scheduler may be generated by using domain profiles in which port priority values of the ports included in each of the components are set. Further, the domain profiles may be XML files.

9 Claims, 6 Drawing Sheets

| PORT ID | PRIORITY VALUE | CONNECTION ID |
|---|---|---|
| A_OutPort#1 | 0 | CONNECTION 1 |
| A_InPort#1 | 1 | CONNECTION 2 |
| A_OutPort#2 | 4 | CONNECTION 3 |
| A_InPort#2 | 5 | CONNECTION 4 |
| A_OutPort#3 | 2 | CONNECTION 5 |
| A_InPort#3 | 3 | CONNECTION 6 |
| ..... | ..... | ..... |

FIG.4B

| COMPONENT ID | PRIORITY VALUE | ..... |
|---|---|---|
| COMPONENT A | 1 | ..... |
| COMPONENT B | 3 | ..... |
| COMPONENT C | 4 | ..... |
| ..... | ..... | ..... |

FIG. 5

```xml
<componentrepid repid="IDL:CF/Resource:1.0"/>
<componenttype>resource</componenttype>
<componentpriority priority ="1"/>

<ports>

<providesrepid="IDL:PushPorts/DoubleSeqConsumer:1.0"
providesname="InPort#1">
<porttype type="data"/>
<portpriority priority ="0"/>
</provides>

<uses repid="IDL:PushPorts/DoubleSeqConsumer:1.0"
usesname="OutPort#1">
<porttype type="data"/>
<portpriority priority ="1"/>
</uses>

<provides repid="IDL:PushPorts/DoubleSeqConsumer:1.0"
providesname="InPort#2">
<porttype type="control"/>
<portpriority priority ="4"/>
</provides>

<uses repid="IDL:PushPorts/DoubleSeqConsumer:1.0"
usesname="OutPort#2">
<porttype type="control"/>
<portpriority priority ="5"/>
</uses>

<provides repid="IDL:PushPorts/DoubleSeqConsumer:1.0"
providesname="InPort#3">
<porttype type="data"/>
<portpriority priority ="2"/>
</provides>

<uses repid="IDL:PushPorts/DoubleSeqConsumer:1.0"
usesname="OutPort#3">
<porttype type="data"/>
<portpriority priority ="3"/>
</uses>

. . . . .

</ports>
```

FIG.6

SYSTEM AND METHOD FOR CONTROLLING PRIORITY IN SCA MULTI-COMPONENT AND MULTI-PORT ENVIRONMENT

RELATED APPLICATION

This application is a Continuation Application of PCT International Application No. PCT/KR2007/004964 filed on Oct. 11, 2007, which designates the United States and claims priority to, and the benefit of Korean Application No. 10-2006-0125045 filed on Dec. 8, 2006. The contents of aforementioned applications are incorporated by reference.

FIELD OF THE INVENTION

The present invention relates to priority control in SCA (Software Communication Architecture) multi-component and multi-port environment, and, more particularly, to a system and a method for controlling priority of a component level and a port level in an SCA-based waveform application having a plurality of components and a plurality of ports. This work was supported by the IT R&D program of MIC/IITA. [2006-S-012-01, Development of Middleware Platform Technology Based on the SDR Mobile Station]

BACKGROUND OF THE INVENTION

Software Communications Architecture (SCA) is a standardized communications software architecture proposed to greatly enhance interoperability between communications systems and reduce a cost for research and deployment by Joint Tactical Radio System (JTRS) Joint Program Office (JPO) of the United States. The SCA guarantees portability and configurable capability of software and hardware devices and guarantees interoperability between products which are built upon the SCA. The SCA employs, as middleware, adopting Common Object Request Broker Architecture (CORBA) of an industry standard of an object model to provide the infrastructure for various hardware device and software to work together. The SCA is an independent system design framework, not limited to a specific system. An SCA-based system is a communication system built upon the SCA. For example, a Software Defined Radio (SDR) system has adopted the SCA as a standard of a software framework. The application in the SCA performs functions of a single waveform. Therefore, several components are assembled in a single package to be installed, deployed, and implemented.

Figure 1:
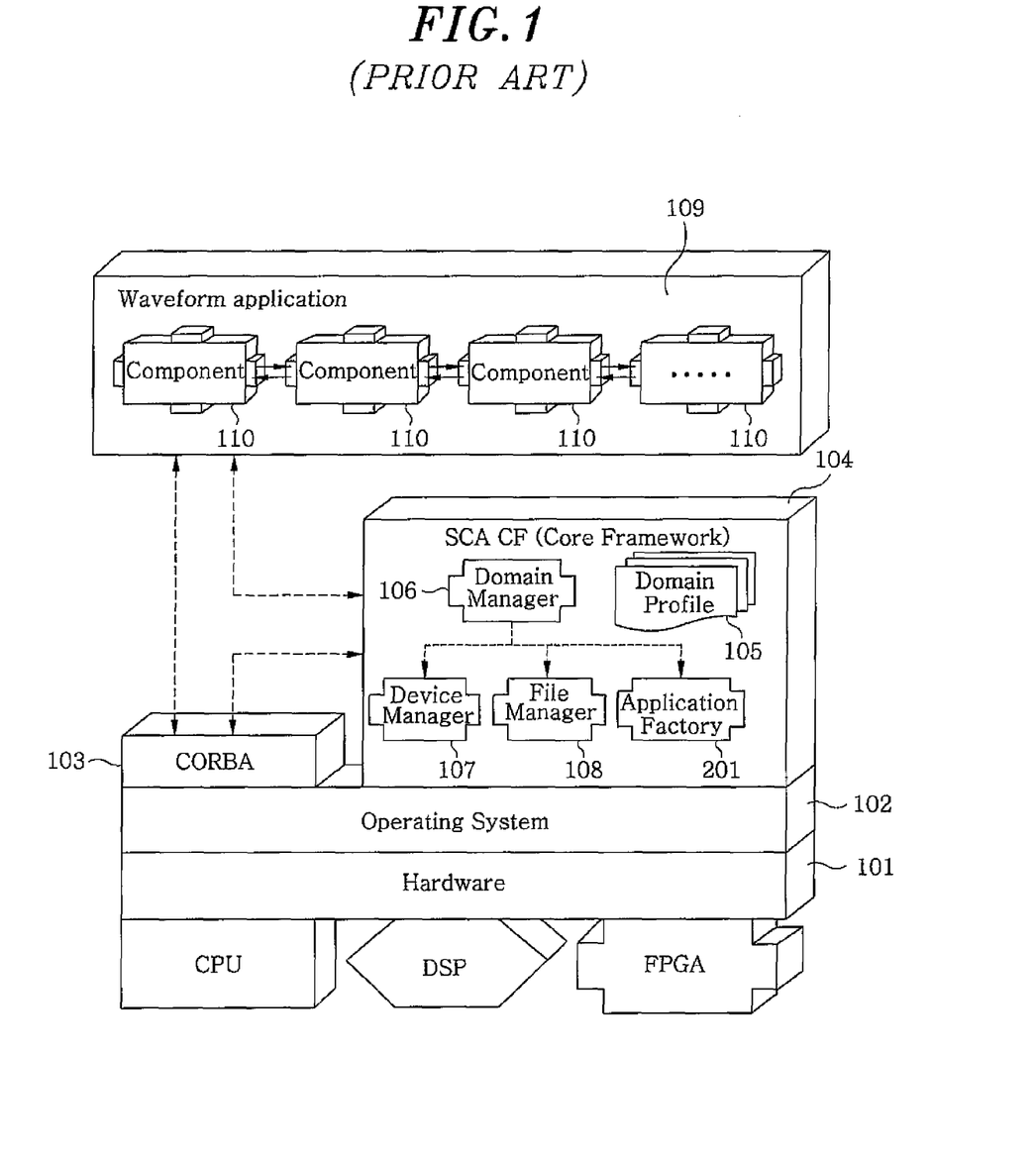
FIG. 1 illustrates the relation of a conventional SCA structure and a waveform application.

The relation of the conventional SCA and a waveform application will be described with reference to FIG. 1, below:

As shown in FIG. 1, in the SCA system, Operating System (OS) 102, CORBA 103, and SCA Core Framework (CF) 104 are arranged above hardware devices 101 such as a Central Processing Unit (CPU), a Digital Signal Processor (DSP), and a Field Programmable Gate Array (FPGA). With domain profiles 105 in the SCA CF 104, various managers of the SCA CF 104 arrange the components 110 of the upper waveform application 109 in related hardware devices to implement. The components of the waveform application communicate with each other by transmitting and receiving information through the ports which is defined in the SCA system for the respective communications. The managers may be a domain manager 106, a device manager 107, a file manager 108, an application factory 201, and the like.

In the SCA aforementioned, when the SCA-based application 109 is running, the components 110 included therein can transmit and receive data through connection set by the application factory 201 for generating an application, by using connection information, included in the domain profiles 105, on a pair of the ports, i.e., an input port (InPort) and an output port (OutPort) connecting a couple of the components. The connection information defined in terms of the InPort and the OutPort is required to be set between all of the components which need to communicate in a single application. Further, in the SCA, the connections are required to be defined as simplex communication. The connection information on the connections between the components and on the ports is managed by defining in the XML file.

A process of running the waveform application in the conventional SCA structure as afore mentioned will be described with reference to FIG. 2.

Figure 2:
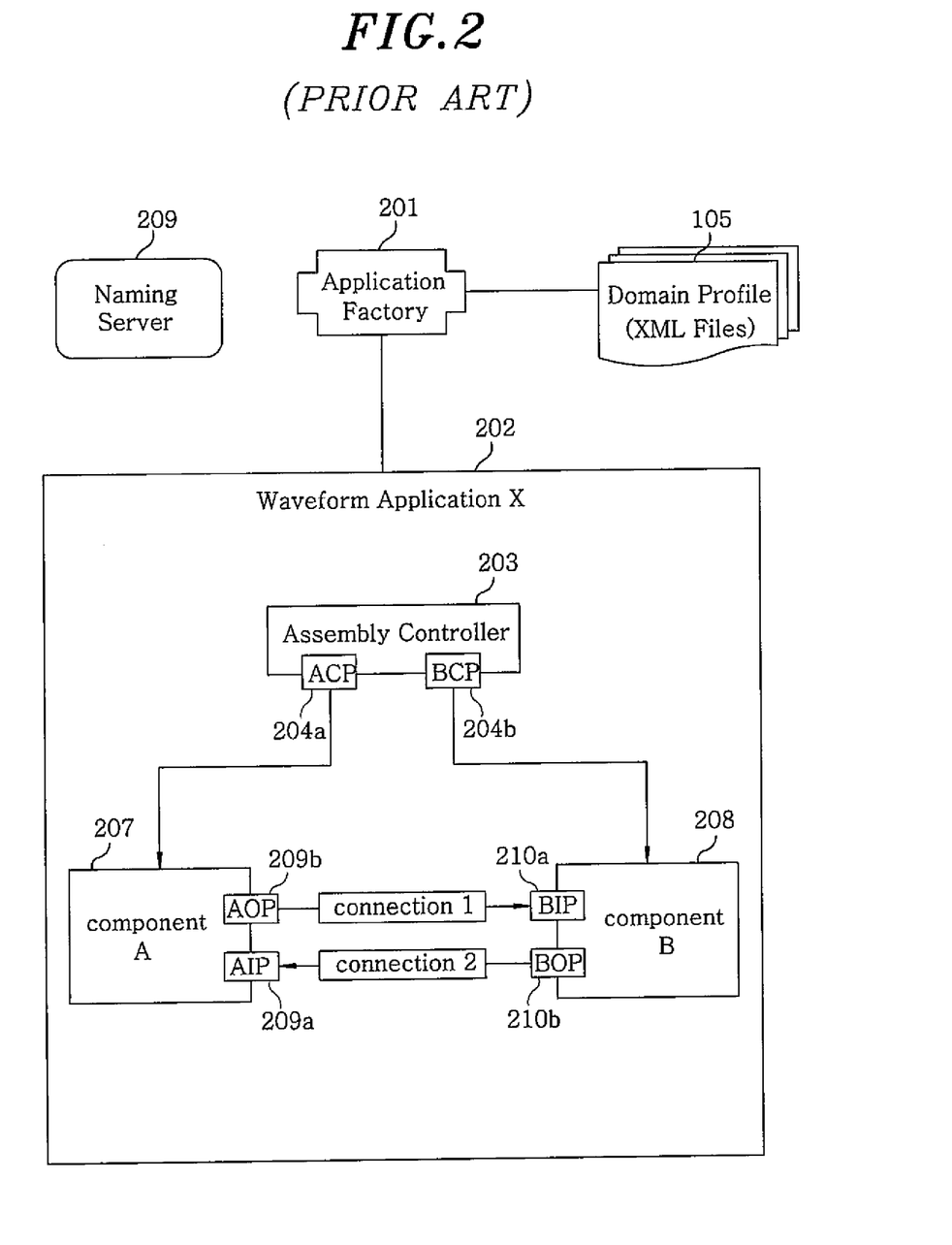
FIG. 2 shows an embodiment of driving the waveform application in the conventional SCA structure.

As shown in FIG. 2, in the conventional SCA structure, all information of a corresponding waveform application is defined in the domain profiles 105 in the XML file format, and the domain profiles 105 are referred when the application is running.

Therefore, the application factory 201 generates the waveform application X by interpreting the information included in the domain profiles 105, and the waveform application X 202 internally performs management of an assembly controller 203 and components, e.g., component A 207 and component B 208.

The assembly controller 203 transmits control information to the component through a control port such as A_ControlPort (ACP) 204a or B_ControlPort (BCP) 204b. Further, in the SCA, the assembly controller 203 and all of the components are registered in a naming server 209 of the CORBA 103. All the components can find the components for communication by retrieving the registered information, and communicate with each other based on it.

The ports of each component in the SCA, however, are controlled by each component internally, without being registered in the naming server 209.

Each component has the connection information in order to communicate with the other component and the connection information is defined as simplex communication. For example, when the component A 207 needs to send information to the component B 208, the component A 207 sent the information to A_OutPort 209b according to a definition in connection 1 where the A_OutPort 209b is previously defined to be connected with B_InPort 210a. As a result, the information sent through the A_OutPort 209b is transmitted via the B_InPort 210a of the component B 208, thereby the component B 208 receiving the information.

In other words, when the conventional SCA-based application initiate to run, the application factory 201 parses the connection information defined in terms of the InPort and the OutPort in the domain profiles (XML files) 105, and then transmits the connection information to each component when the SCA-based application is running.

Based on the connection information, each component can communicate with each other by transmitting data through OutPort Object Reference which corresponds to an output port in connection with the other component for communication.

In the conventional domain profiles, however, there is no definition of priority order of the ports of the component when the component communicates with others through the ports so that it is impossible to control the priority of the ports. That is, when data is received through a port while another port is performing a job, the received job through the port cannot be started until the end of the preceding job which is being performed. Therefore, in the SCA in which the application is a protocol stack of a mobile communication network, protocol control information and data information are different in priority but cannot be differentiated. As a result, the conventional SCA cannot provide the quality of service (QoS) demanded in mobile communication services.

SUMMARY OF THE INVENTION

In view of the above, the present invention provides a system and a method for controlling priority of jobs of a plurality of components and of ports in an SCA-based waveform application having the components and of the ports, wherein the control of the priority is performed by using a priority component scheduler and a priority port scheduler based on the priority information including component priority order of each of the components and port priority order of each of the ports, the priority information being stored in domain profiles.

In accordance with a first aspect of the present invention, there is provided a system for controlling priority in a SCA-based application having a plurality of components wherein each of the components has a plurality of ports, including: a priority component scheduler, interworking with the plurality of components, in which component priority order of the components is arranged; and a priority port scheduler, provided in each of the components including the plurality of the ports which are associated with connections between the components, in which port priority order of the ports included in each of the components is arranged.

It is preferable that the priority component scheduler is generated by using domain profiles in which component priority values of the components are set.

It is also preferable that the priority port scheduler is generated by using domain profiles in which port priority values of the ports included in each of the components are set. Further, the domain profiles may be XML files.

In accordance with a second aspect of the present invention, there is provided a method for controlling priority when a SCA-based application is working wherein the application has a plurality of components and each of the components includes a plurality of ports, including: performing a job through one of the ports included in one of the components; checking whether a job request is received through other ports connecting the same component with other components while said performing is continued; detecting, if the received job request is checked in said checking, port priority order of the port through which the job is being performed and the port receiving the job request in priority port scheduler; and performing the jobs in order according to the detected port priority order of the port through which the job is being performed and the port receiving the job request.

It is preferable that the method for controlling priority further includes: creating, when a new port is additionally provided to the components, a domain profile in which the port priority value of the new port is set; and updating the priority port scheduler by using the created domain profile. Further, the domain profile may be an XML file.

In accordance with a third aspect of the present invention, there is provided a method for controlling priority in component level in a SCA having a plurality of components, including: performing a job of one of the components in the SCA; checking whether a job of another component in the SCA is requested from an operating system (OS); detecting, if the component receiving the job request is checked in said checking, component priority order of the component performing the job and the component receiving a job request in priority component scheduler in which component priority order of the components is set; and performing the jobs in order according to the detected component priority order of the component performing the job and the component receiving a job request.

It is preferable that the method for controlling priority in component level further includes: creating, when a new component is additionally provided, a domain profile in which the component priority value of the new component is set; and updating the priority component scheduler by using the created domain profile. Further, the domain profile may be an XML file.

BRIEF DESCRIPTION OF THE DRAWINGS

The objects and features of the present invention will become apparent from the following description of preferred embodiments given in conjunction with the accompanying drawings, in which.

DETAILED DESCRIPTION OF THE EMBODIMENTS

Hereinafter, embodiments of the present invention will now be described with reference to the accompanying drawings which form a part hereof.

Figure 3:
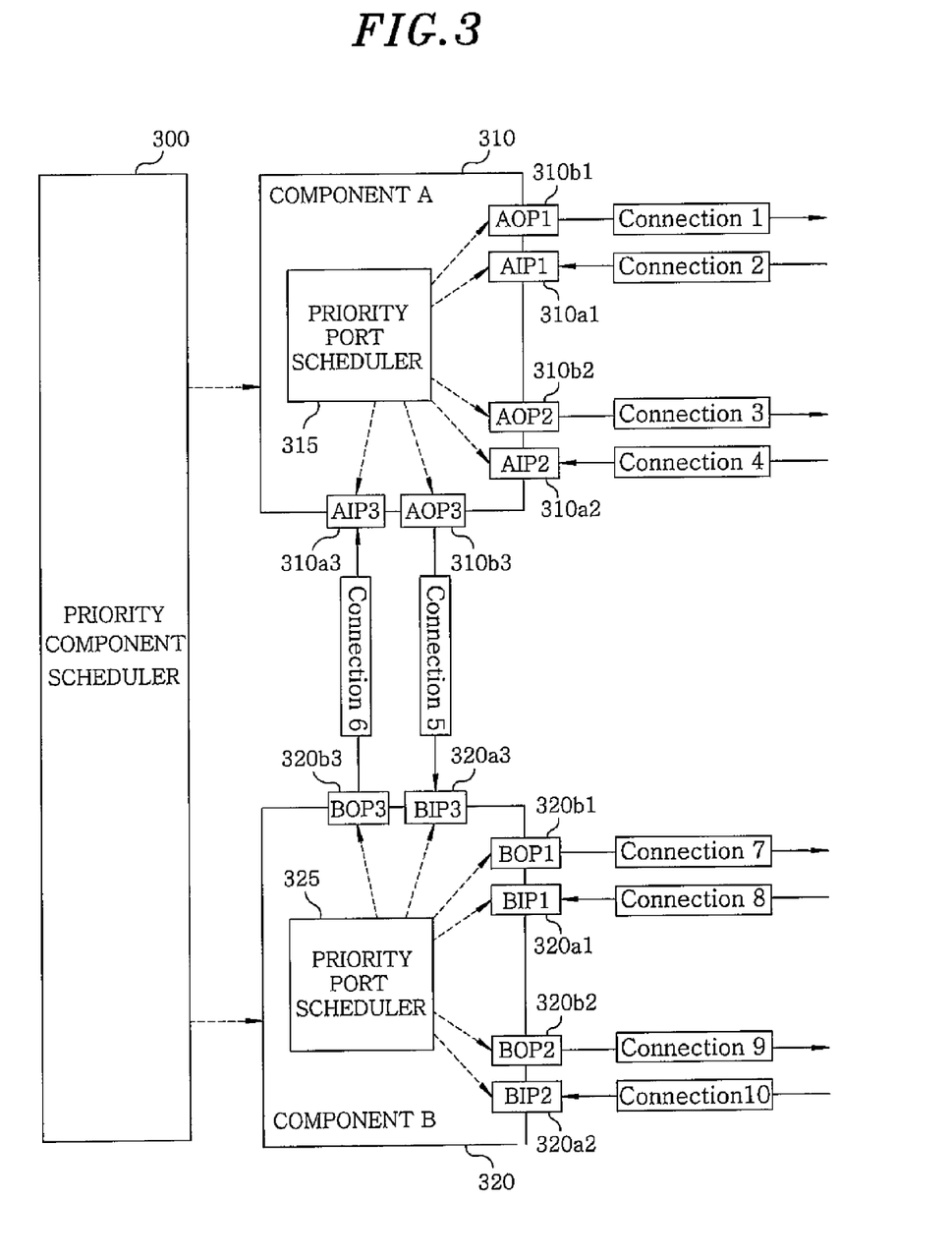
FIG. 3 describes a system for controlling priority in an SCA-based waveform application with multi components and multi ports in accordance with an embodiment of the present invention.

FIG. 3 is a block diagram of a system for a priority control on a component level and a port level of SCA-based waveform application with a plurality of components with a plurality of ports in accordance with an embodiment of the present invention. The system has a priority component scheduler 300, and a component A 310 and a component B 320 which are connected to the priority component scheduler 300 and include priority port schedulers 315 and 325 respectively.

As illustrated in FIG. 3, the SCA-based waveform application may have a plurality of SCA components such as component A 310 and component B 320. Each of the SCA components may have a plurality of SCA connections in order to communicate with other SCA components. Therefore, the components A 310 and the component B 320 include a plurality of, e.g., N, input ports (Inports) 310$a$1 to 310$a$N and 320$a$1 to 320$a$N respectively, and output ports (Outports) 310$b$1 to 310$b$N and 320$b$1 to 320$b$N respectively, which each of the ports are associated with the SCA connection. For example, the ports, in component A 310, connected with other components via connection 1 to connection 6 are A_Outport #1 (AOP1) 310$b$1, A_Inport #1 (AIP1) 310$a$1, A_Outport #2

(AOP2) 310b2, A_Inport #2 (AIP2) 310a2, A_Outport #3 (AOP3) 310b3, and A_Inport #3 (AIP3) 310a3 respectively. Moreover, the ports, in component B 320, connected with other components via connection 5 to connection 10 are B_Inport #3 (BIP3) 320a3, B_Outport #3 (BOP3) 320b3, B_Outport #1 (BOP1) 320b1, B_Inport #1 (BIP1) 320a1, B_Outport #2 (BOP2) 320b2, and B_Inport #2 (BIP2) 320a2, respectively.

In the multi-component and multi-port environment, a component priority in component level between the component A 310, the component B 320, and other components is controlled by the priority component scheduler 300 of the CORBA ORB (Object Request Broker), while a port priority between the Inports and Outports included in each component is controlled by using its own priority port scheduler 315 or 325 and the like included in the each component.

The priority component scheduler 300 interworks with the components 310 and 320. The priority values of the component A 310, the component B 320, and the like are set in the priority component scheduler 300 in order to control the priority order thereof. That is, when a job request to one of the components from an OS (Operating System) is received while a job of another component is being performed, priority values of these two components are retrieved by using the component scheduler 300 and the component to be executed ahead is selected according to the retrieved results, and then the job with respect to the selected component is performed.

Each component includes the Inport and the Outport which are associated with the connections with other components. For example, the component A 310 and the component B 320 include the Inports 310a1 to 310aN and 320a1 to 320aN respectively, and Outports 310b1 to 310bN and 320b1 to 320bN respectively, wherein the ports corresponds to the connections 1 to 10 with a plurality of other components. Further, the component A 310 and the component B 320 respectively include the priority port scheduler 315 and 325 in which the port priority values are set in order to control the priority order of the Inports and the Ourports.

Figure 4A:
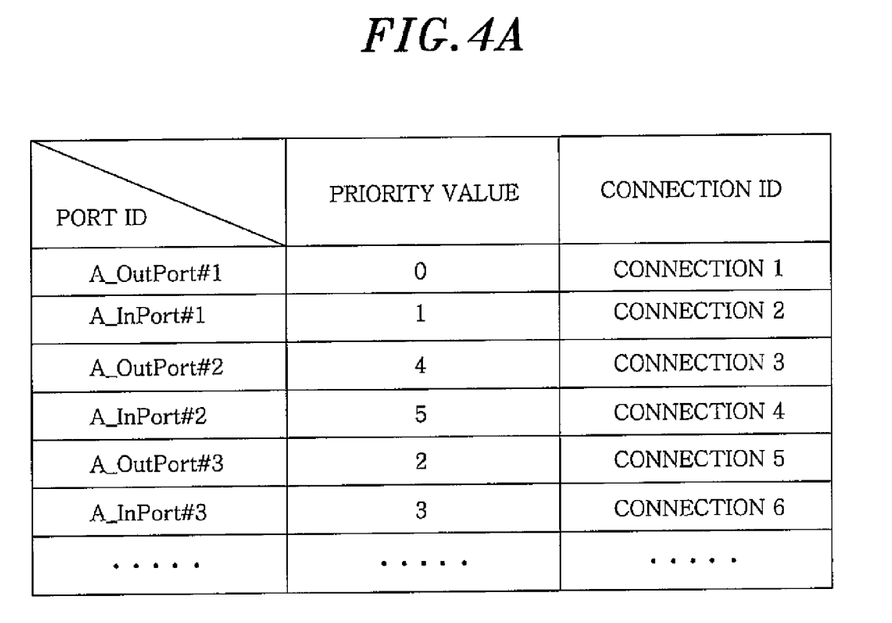
FIG. 4A is a view of a port priority table in which priority value of each port in a component A is set to be applied to the embodiment of the present invention.
Figure 5:
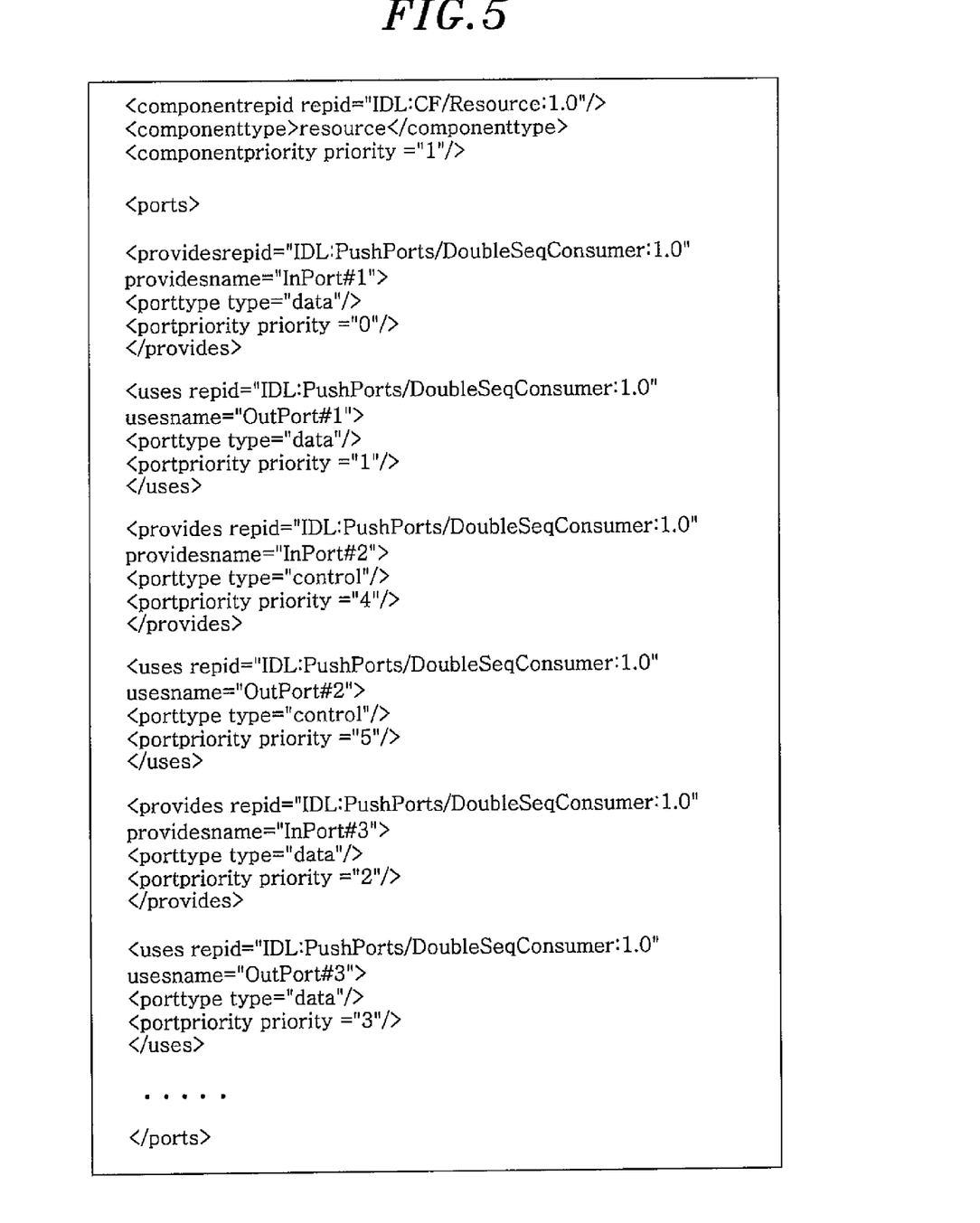
FIG. 5 is a view of an XML domain profile including priority information of the component A and of the ports thereof in accordance with the embodiment of the present invention.

For example, the priority port scheduler 315 included in the component A 310 has a port priority table, as shown in FIG. 4A, with respect to all of the ports included in the component 310, wherein the table is formed by interpreting the domain profiles 105 in the XML format as illustrated in FIG. 5. Jobs requested through the Inports and the Outports are performed in order by being arranged based on the port priority table.

FIG. 5 shows the XML domain profile including the priority order information on the Inports and the Outports in the component A 310. In the XML domain profile, "componentpriority" is allocated for the component priority value of the component A 310 and "portpriority" is allocated for the port priority values of the ports thereof. Further, names of the Outports for data transmission is assigned to "uses" and names of the Inports for data reception is assigned to "provides". Through these variables aforementioned, the priority component scheduler 300 or the priority port schedulers 315 and 325 are updated when a new component or a new port is provided.

Figure 4B:
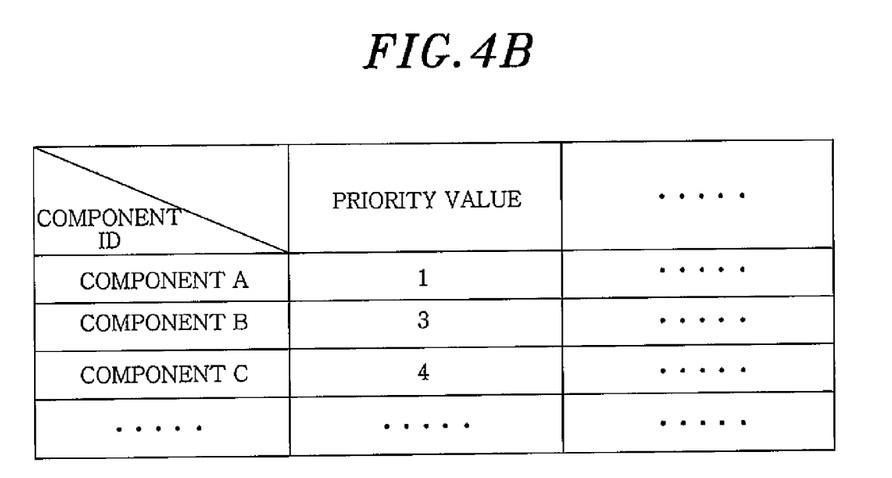
FIG. 4B is a view of a component priority table in which priority value of each component in a CORBA ORB is set to be applied to the embodiment of the present invention.

The priority component scheduler 300 of the CORBA ORB interprets the domain profiles 105 in the XML format as shown in FIG. 5 to provide the component priority table, as illustrated in FIG. 4B, of each of the component A 310, the component B 320, and the like, thereby arranging order of the events or jobs requested to each component based on the component priority table.

Generally, in a communication system, traffic data has higher priority than control data. Therefore, in order to put high priority to a port for the traffic data, the port for the traffic data is set to have a higher priority value in the priority port schedulers 315 and 325. Accordingly, when the traffic data is received or transmitted while data is inputted or outputted through a port for processing control data, the traffic data is processed first, and then subsequently processing of the data control is resumed.

Specific priority values may be different depending on the kinds of the waveform applications and is required to be properly allocated for optimization of the performance of the corresponding waveform application.

An operation process of a priority control system configured as above mentioned will be described with reference to FIG. 6.

Figure 6:
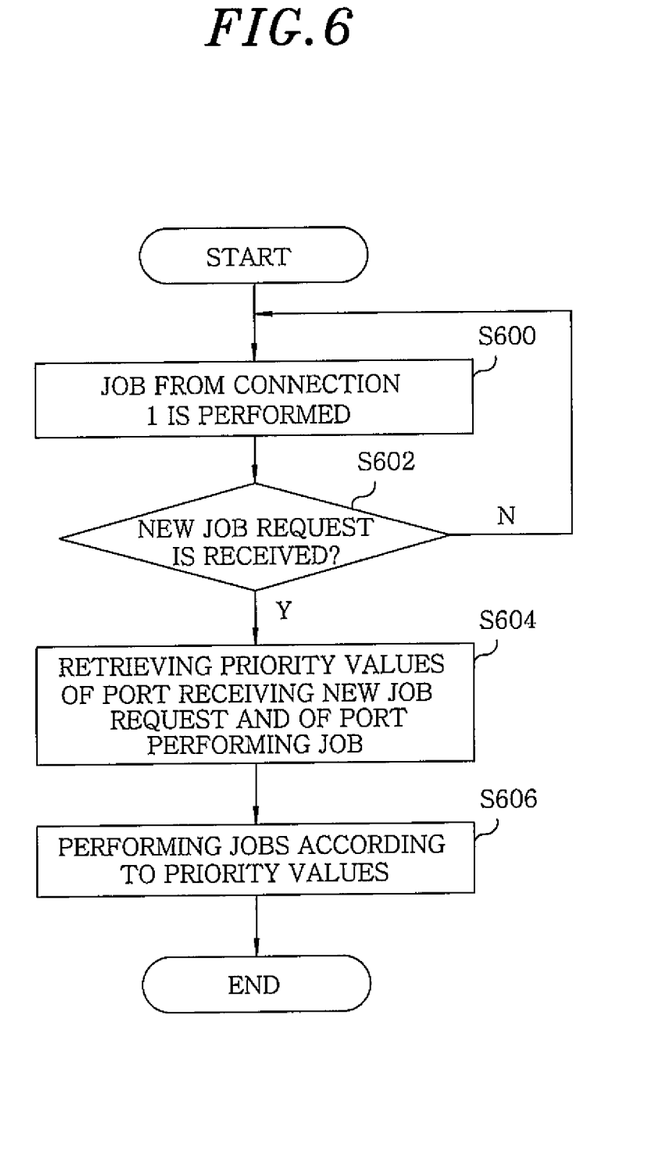
FIG. 6 is a flow chart describing a process of controlling priority in a port level in accordance with an embodiment of the present invention.

FIG. 6 describes a flow chart of a port priority control process in according to an embodiment of the present invention.

As shown in FIG. 6, at first, a job of transmitting data from the component A 310 to e.g., a component C (not shown) which is connected with the component A through the A_OutPort #1 310b1 via connection 1 is performed (Step 600).

While the job in the Step 600 is being performed, it is checked whether a job request from another component, e.g., the component B 320 is received through the other port of the component A 310 (Step 602).

If it is checked in the step S602 that the job request is received via the connection 6 between A_InPort#3 310a3 of the component A 310 and B_OutPort#3 320b3 of the component B 320, the priority port scheduler 315 in the component A 310 retrieves port priority values of the A_OutPort#1 310b1 and the A_InPort#3 310a3 from the port priority order table such as illustrated in FIG. 4A (Step 604).

According to the retrieved result in the Step 604, the priority value of the A_InPort#3 310a3 (having the priority number 3) is greater than that of the A_OutPort#1 310b1 (having the priority value 0). Therefore, the component A 310 first carries out the job with the component B 320 requested via the connection 6, and subsequently performs the job which had been being performed (Step 606).

As for the component level, the priority control of the components is performed by the priority component scheduler 300. That is, when a job of the component B 320 is requested while a job of the component A 310 is being performed, the priority values of the component A 310 and the component B 320 are retrieved from the component priority table as illustrated in FIG. 4B in the priority component scheduler 300. Then, according to the retrieved result, the job of the component B 320 with higher priority is first performed and then the job which has been in process by the component A 110 is subsequently resumed.

In accordance with the present invention, the priority order of the component level and port level can be arranged by using the priority component scheduler 300 in which the component priority values of the components are set, and the priority port schedulers 115 and 125 in which the port priority values of ports included in each component are set.

As described above, in the present invention, when the waveform application is executed in the SCA, the priority order control is performed by using the priority component scheduler and the priority port scheduler where the priority values of the components and the priority values of the ports are explicitly set respectively. Therefore, when there is a job request to a component or through a port with a higher priority value, the job can be first performed even though a job of a component or a port with lower priority is being performed. Consequently, the quality of service as desired in the SCA architecture is satisfied.

While the invention has been shown and described with respect to the preferred embodiments, it will be understood by those skilled in the art that various changes and modifications may be made without departing from the spirit and scope of the invention as defined in the following claims.

What is claimed is:

1. A system for controlling priority when a Software Communication Architecture (SCA)-based application is working wherein the application has a plurality of components and each of the plurality of components includes a plurality of ports and a priority port scheduler, wherein each of the plurality of ports connect to other ports of other components, the system comprising a processor configured to perform the following:
    performing a first job through one of the ports included in a first component of the plurality of components;
    checking whether a second job request is received through one of the other ports of the first component while said performing is continued;
    comparing, by the priority port scheduler in the first component, a port priority value of the port through which the first job is being performed and a port priority value of the one of the other ports receiving the second job request;
    stopping the performance of the first job if the other port receiving the second job request has a higher port priority value than the port through which the first job is currently being performed, wherein the first job is resumed after the second job ends,
    wherein each priority port scheduler in each component has a port priority table,
    wherein, the port priority table includes a plurality of port identifiers with respect to all of the ports in the component, each of the plurality of port identifiers has a port priority value and a connection identifier in order to communicate with another component,
    wherein the port priority table is formed by interpreting one or more domain profiles located outside the SCA-based application.

2. The system of claim 1, wherein the priority port scheduler is generated by using domain profiles in which port priority values of the ports included in each of the components are set.

3. The system of claim 2, wherein the domain profiles in which the port priority values of the ports are set are XML files.

4. A method for controlling priority when a Software Communication Architecture (SCA)-based application is working wherein the application has a plurality of components and each of the plurality of components includes a plurality of ports and a priority port scheduler, wherein each of the plurality of ports connect to other ports of other components, comprising:
    performing a first job through one of the ports included in a first component of the plurality of components;
    checking whether a second job request is received through one of the other ports of the first component while said performing is continued;
    comparing, by the priority port scheduler in the first component, a port priority value of the port through which the first job is being performed and a port priority value of the one of the other ports receiving the second job request
    stopping the performance of the first job if the other port receiving the second job request has a higher port priority value than the port through which the first job is currently being performed, wherein the first job is resumed after the second job ends,
    wherein each priority port scheduler in each component has a port priority table,
    wherein, the port priority table includes a plurality of port identifiers with respect to all of the ports in the component, each of the plurality of port identifiers has a port priority value and a connection identifier in order to communicate with another component,
    wherein the port priority table is formed by interpreting one or more domain profiles located outside the SCA-based application.

5. The method for controlling priority of claim 4, further comprising:
    creating, when a new port is additionally provided to the components, a new port domain profile in which the port priority value of the new port is set; and
    updating the priority port scheduler by using the new port domain profile.

6. The method for controlling priority of claim 5, wherein the new port domain profile is an XML file.

7. The system of claim 1, further comprising:
    a priority component scheduler, interworking with the plurality of components, in which a component priority order of the components is arranged.

8. The system of claim 7, wherein the priority component scheduler is generated by using profiles in which component priority values of the components are set.

9. The system of claim 8, wherein the domain profiles in which the component priority values of the components are set are XML files.

* * * * *